Patented Nov. 13, 1945

2,388,962

UNITED STATES PATENT OFFICE 2,388,962

DRY CLEANING COMPOSITION

Lawrence H. Flett, Hamburg, N. Y., assignor to Allied Chemical & Dye Corporation, a corporation of New York No Drawing. Application January 24, 1938,
Serial No. 186,733

18 Claims. (Cl. 252—161)

This invention relates to improvements in the dry cleaning of fibrous, textile and related materials. It relates particularly to improved compositions for use in dry cleaning and to processes of dry cleaning in which said improved compositions are employed.

According to the present invention sulfonated aromatic compounds containing an alkyl group containing from 20 to 30 carbon atoms are employed as assistants in the cleansing of materials, and especially fibrous materials, by the dry cleaning process.

The said alkyl group may be linked directly to the nucleus of the aromatic sulfonic acid compound or it may be joined thereto by means of an atom or radical, as for example, an oxygen atom, or one of the radicals —NH—, —CONH—, —NHCO—, —CO—, —CO.O—, —O.CO—, etc. It may be an alkyl hydrocarbon radical or may contain substituents such as halogen, aryl, alkoxy, etc.

The aromatic nuclei of said sulfonated compounds may be mononuclear, as for example, phenyl, tolyl, etc. or dinuclear, as for example, naphthyl, diphenyl, etc. The aromatic nuclei may be free from further substituents, or they may contain one or more substituents; as for example, chlorine, —OH, alkyl, alkoxy, and/or carboxyl (in the free acid or salt form).

The said compounds in the form of their free sulfonic acids corresponds with the formula

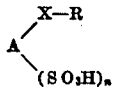

where A is a mono or dinuclear aromatic residue; R is a saturated or unsaturated, substituted or unsubstituted alkyl group which contains 20 to 30 carbon atoms joined carbon to carbon and in which the substituents, if any, may be hydroxy, alkoxy, aryl, halogen, etc.; X is either a bond joining a carbon atom of the alkyl group represented by R to a carbon atom of the aromatic nucleus represented by A, or is a linking atom or group of atoms, e. g. —O—, —NH—, —NHCO—, —CO—, —COO—, etc.; and $n$ is an integer, being preferably 1.

Those compounds in which the aromatic nuclei are mononuclear are preferred; e. g., the aromatic sulfonates which in the form of their free sulfonic acids correspond with the formula

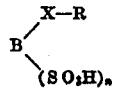

in which B represents a mononuclear aromatic substituted or unsubstituted residue, and X, R and $n$ have the meaning defined above. Further, those compounds are preferred in which the alkyl group represented by R in the above formulas is linked directly to the aromatic nucleus by a carbon to carbon bond. As above indicated, the monosulfonates are preferred to the polysulfonates. The specially preferred class of compounds comprises the mononuclear aromatic sulfonates which in the form of their free sulfonic acids correspond with the formula $RBSO_3H$ in which B represents a mononuclear aromatic residue, and R is an alkyl group containing 20 to 30 carbon atoms. Those containing a branched carbon chain in the alkyl group are preferred. Preferably the alkyl group is free from substituents, and more particularly is a saturated hydrocarbon radical. The compounds which contain an alkyl group of 23 to 26 carbon atoms are particularly effective dry cleaning agents.

This invention includes the use of various salts of the said sulfonic acids in which the hydrogen of the sulfo or other acidic groups is replaced by an inorganic or organic salt-forming radical. Among the more easily procured salts are the ammonium, alkali-metal, alkaline earth metal salts and the salts in which the acidic groups are neutralized by the more common organic bases, such as mono-, di-, or triethanolamine, pyridine, ethylene diamine, amylamines, triethylene tetramine, etc. If the salt-forming basic component is polyacidic, it may be neutralized in part with the above defined sulfonic acids and in part by other acidic materials which may be of a detergent nature.

The said salts of aromatic sulfonic acid compounds, and particularly their alkali metal and organic ammonium salts, are soluble in volatile organic liquids of the type generally employed in dry cleaning (e. g. cleaning naphtha, carbon tetrachloride, trichlorethylene, etc.) in which they exert a desirable detergent action. The said salts of aromatic sulfonic acid compounds further have the valuable property of forming emulsions of water in the said organic liquids, and hence may be employed for the production of dry cleaning compositions in the form of emulsions containing the organic dry cleaning liquid in the external phase and water in the internal base.

Compared with the lower nuclearly alkylated aryl sulfonic acids, they are distinctly less soluble in water and somewhat more soluble in dry cleaning solvents; they are able to disperse more water as the internal phase of a water-in-dry cleaning solvent emulsion, and they impart superior detergent powers to their solutions in dry cleaning solvents. They are, therefore, particularly desirable as constituents of dry cleaning baths which contain emulsified water and are intended and used for the purpose of removing simultaneously dirt which is insoluble, soil which is soluble in organic solvents, soil which is soluble in water and soil which is softened by organic solvents or water. Such emulsions may contain up to about 1 per cent by weight of water without any separation of water-gloubles in the mixture upon standing for twenty-four hours. The said emulsions are excellently suited for dry cleaning and can be used for removing simultaneously oil-soluble and water-soluble stains from delicate fabrics, without fear of water-spotting.

Compositions which are of particular interest for use in accordance with the present invention are mixtures of sulfonates of alkylated aromatic compounds which contain alkyl groups of 20 to 30 carbon atoms and are made by sulfonating the mixtures of alkylated aromatic compounds which are obtained by condensing suitable aromatic compounds, for example benzene, toluene, etc. with a mixture of alkylating agents, such as chlorinated hydrocarbons derived from pure hydrocarbons, or preferably from a mixture of hydrocarbons having a molecular carbon content of 20 to 30 carbon atoms. Such mixtures are more soluble in dry cleaning solvents, and are much more effective dispersing agents and detergents than the simple compounds. Suitable hydrocarbon mixtures are obtained readily from naturally-occurring hydrocarbons such as petroleum, shale oil, or from processed hydrocarbons derived from them. Certain mixtures of this type, and processes of making them, are described and claimed in my copending application Serial No. 344,379, filed July 8, 1940. Hydrocarbon fractions or distillates can be used which are known by their boiling ranges to comprise substantially the hydrocarbons of the desired average molecular carbon content. For example, suitable mixtures of petroleum hydrocarbons with molecules which contain 20 to 30 carbon atoms may be selected as distillates of petroleum the major portions of which boil between about 195° C. and about 295° C. at about 15 mm. absolute pressure.

The mixed products obtainable by incompletely halogenating a suitable fraction of petroleum distillate of the desired carbon content, condensing the resulting mixed alkyl halides with an aromatic compound while having present in the reaction mixture unhalogenated hydrocarbon material initially employed, and sulfonating the resulting condensation product and converting the sulfonation product to a salt thereof while still retaining in the composition said hydrocarbon material are of especial value for use in accordance with the present invention. Such a desirable mixture of alkyl halides and unhalogenated hydrocarbon material can be prepared by directly halogenating a selected hydrocarbon material until the resulting halogenated mixture contains an amount of organically-combined halogen which is less than that required theoretically for dihalogenation of the hydrocarbon material. For example, by passing a stream of chlorine gas into a suitable petroleum fraction at about 50° C. in the presence of actinic light or a catalyst until the mixture contains an amount of organically-combined chlorine equal to about 1¼ times that required theoretically for monochlorination of the hydrocarbons in the petroleum fraction, a part of the mass of hydrocarbons is not halogenated, and the final mixture thus contains a considerable portion of unchlorinated hydrocarbons. Such mixtures are of special value because in the subsequent condensation and sulfonation steps in the processes of preparing directly alkyl aryl sulfonates for use in accordance with the present invention, the unreacted hydrocarbons in the mixtures act as diluents which make the reacting masses fluid and allow the reactions to proceed smoothly and uniformly, and they pass on as oily constituents into the final dry cleaning paste compositions in which the said non-halogenated hydrocarbons become intimately and uniformly blended, and impart increased solubility in dry cleaning solvents to the pastes.

Dry-cleaning baths which contain the said compositions, and thus comprise the residual, high molecular, unchlorinated oily hydrocarbons, have the novel advantage of imparting to the fabrics which are cleaned in such baths a soft smooth feel, a small amount of the oily hydrocarbons being retained by the cleaned fabric.

One of the outstanding characteristics of the dry cleaning compositions of this invention is their ability to achieve excellent cleaning action in low concentrations. The said dry cleaning compositions are characterized in that the weight ratio of sulfonic acid salt to organic, substantially water-immiscible solvent or solvent mixture (dry cleaning solvent) in the average dry cleaning mixture which is applied for dry-cleaning soiled fabrics, as for example, dress goods, is generally less than 0.3 to 100, while in the more concentrated mixtures, which are applied for example as spotting solutions, or for cleaning gloves, hats and the like, the weight ratio seldom exceeds 5 to 100, and in most cases is less than 3 to 100. Further, by their advantageous emulsifying action they hold in suspension in the dry cleaning solvent the dirt particles removed from the material undergoing cleaning and prevent their redeposition. This is particularly advantageous in cleaning white fabrics; graying being thereby greatly reduced.

The compositions of this invention are particularly effective in dispersing water in the dry cleaning fluids. The sulfonates are jointly soluble in the dry cleaning solvent and in the water, and because of their dispersing action in both water and the solvent, they show a powerful cleansing action not obtainable when the water is absent. Thus in the dry cleaning compositions containing water, it is possible to remove oil soluble or oil softened soil, water soluble and water softened soil, as well as a greater amount of insoluble soil than it is possible to remove in the absence of the water. Inasmuch as the water solutions of the said compounds in the form of their alkali metal salts are neutral in reaction, dry cleaning compositions containing water and said compounds may be safely used for the cleaning of delicate white and dyed silks and other fine fabrics without fear of the undesirable changes in dye shades and color tones which often accompany the use of detergent compositions in dry cleaning baths.

Improved finish and/or feel of the cleaned fabric, e. g., silks, can often be obtained by incorporating a small amount of paraffin wax or paraffin oil or a petroleum hydrocarbon containing 20 to 30 carbon atoms or other similar agent in the cleaning compositions, if sufficient lubricant is not otherwise contained therein.

The compositions of the present invention can be used in dry cleaning various materials by various procedures. Thus they can be used as assistants or substitutes for the usual dry cleaning soaps or pastes in dry-cleaning baths, including the single bath and multiple bath methods of operation, and they can be employed in spotting and brushing compositions. In accordance with the usual practice in dry cleaning, the amounts of the compositions employed will vary with the degree of soil of the material being cleaned. In general, to effect an equal cleansing action, lesser amounts of the compositions of the present invention are required than are required in the cases of dry cleaning soap compositions heretofore known. By reason of the neutral reaction of the alkali metal salts of the sulfonic acids employed in accordance with the present invention, said compositions can be used for the cleaning of fibers and fabrics of all types including woolens, silks, artificial silks, leather, etc. The compositions, by reason of their solubility in the dry cleaning solvents, can be employed in dry cleaning apparatus involving a filtering system without building pressure in the filters.

For general use, effective cleaning-fluid compositions have been obtained by adding to each 100 parts by weight of cleaning solvent about one-twentieth of a part by weight or more of the mixed alkyl-aryl sulfonates herein described. Because of the ready solubility of the said alkyl aryl sulfonates in dry cleaning solvents, dry cleaning solutions which contain 20 per cent or more of their weight of the organic detergent salts can be made. Such concentrated solutions are not required.

For most commercial dry-cleaning processes in which it is desired to use the minimum amount of organic detergent salts, solutions for cleaning which contain 0.3 part or less by weight of the organic detergent salts in 100 parts by weight of solvent are highly effective and preferred.

For purposes which require intensive action on small areas, dry cleaning solutions which contain up to about 3 parts by weight of organic detergent in 100 parts by weight of dry-cleaning solvent are effective and preferred. Thus 3 per cent by weight solutions of the organic detergent salts in Stoddard solvent make admirable spotting solutions; similar solutions containing 0.6 per cent by weight of the organic detergent salts are valuable compositions for cleaning gloves; and those which contain 0.3 per cent by weight of the said salts are effective cleaning solutions for felt hats.

The following examples illustrate several methods of preparing alkyl aromatic sulfonates useful in connection with the present invention. It will be evident from a consideration of the disclosure herein that the invention is not limited to the use of products prepared in this manner but includes products, of the type referred to herein, prepared in other ways. The parts are by weight and temperatures are in degrees centigrade.

*Example 1.*—100 parts by weight of tricosyl phenol (obtained by condensing tricosanol-7, $C_{16}H_{33}.CHOH.C_6H_{13}$, $C_{16}H_{33}$ and $C_6H_{13}$ being straight-chain alkyl groups, with phenol) were treated with 222 parts by weight of 66° Bé. sulfuric acid at 95° C. with agitation and held at that temperature for about one hour (until a sample was soluble in water and did not precipitate lime salts). The sulfonation mix was poured into water and made neutral to Delta paper with caustic soda. (Congo paper, Brilliant Yellow or Brom-Cresol Blue could also be used as indicators, and other alkali, for example, caustic potash, or other equivalents could be used.) The neutral soution was evaporated to dryness. The product comprised a secondary-alkyl phenol sulfonate containing 23 carbon atoms in a branched hydrocarbon chain.

*Example 2.*—385 parts of white oil—a purified colorless petroleum distillate with a specific gravity of 0.849 at 22°, 90 per cent of which distilled from 215° to 285° at 25 mm. and which, on the basis of these properties, was regarded as comprising a hydrocarbon mixture in which the molecular carbon content of the hydrocarbons ranged from 20 to 28 carbon atoms and averaged 22 to 23 carbon atoms—were chlorinated at a temperature between 60° and 65° with chlorine gas with the influence of diffused daylight, until the chlorinated mass contained 60 parts of organically combined chlorine. The chlorinated white oil was added to an agitated mixture of 20 parts of anhydrous aluminum chloride and 225 parts of benzene, and the mixture was stirred for one hour between 25° and 30° and one hour between 45° and 55°. The mixture was then allowed to stand 16 hours. It separated into two layers. The upper layer was decanted, washed with an equal volume of a two per cent aqueous hydrochloric acid solution, and distilled until the boiling point of the residual mixture was 100° at 20 mm. mercury pressure (to remove chiefly unreacted benzene). The residual oil was characterized by an amber color and a slight bloom. Approximately 25 per cent of this oil distilled below 205° at 5 mm. pressure. The remainder was chiefly nuclearly alkylated benzenes in which the alkyl groups had an average carbon content of 22 to 23 carbon atoms and corresponded with the average molecular carbon content of the hydrocarbons in the white oil.

65 parts of the residual oil were diluted with 12 parts of Stoddard solvent (Dept. of Commerce Bulletin—Commercial Standard CS. 3–28), and, to the rapidly agitated mixture, 16 parts of chlorsulfonic acid were added slowly while the temperature of the reacting mass was maintained, by indirect cooling, between 10° and 15°. The mixture then was agitated, without cooling, for two hours after evolution of hydrogen chloride from the mixture had subsided. To the resulting mass an aqueous fifty per cent caustic soda solution was added until the resulting pasty mass was basic to Congo red paper and neutral to Brilliant Yellow paper. It was then diluted with 8.5 parts of water and thoroughly mixed. The paste finally obtained dispersed easily in Stoddard solvent and in chlorinated dry cleaning solvents, such as carbon tetrachloride and trichlor ethylene. Mixtures of this paste with Stoddard solvent, which contain five volumes or less of the paste per 100 volumes of the mixture, appeared turbid by reflected light, but were substantially optically clear by transmitted light. Stable dispersions in any proportions of this paste and Stoddard solvent or other equivalent dry cleaning solvent can be made by agitating the paste with the solvent.

50 parts of this paste were diluted with 33 parts of Stoddard solvent. The resulting oily paste can be diluted further with water, and will not stratify until the diluted mixture contains more than 30 per cent water. The non-stratified water-diluted paste dispersed easily in Stoddard solvent. Two parts by volume of the said diluted paste (containing about 30 per cent by volume of water) in 100 parts by volume of Stoddard solvent was somewhat turbid, but was very stable and did not stratify even on standing for 24 hours, notwithstanding the presence of the water.

*Example 3.*—267 parts of parawax (i. e., colorless paraffin wax recovered in the usual manner from Pennsylvania petroleum) having a melting point in the range about 50° to 57°, were melted and chlorinated with a direct stream of chlorine in diffused sunlight at a temperature between 75° and 90° until the mixture had gained 20 per cent of its weight as organically combined chlorine.

170 parts of the resulting chlorinated hydrocarbon mixture were run slowly into an agitated mixture of 10 parts of aluminum chloride and 110 parts of technical benzene. Hydrogen chloride generated was permitted to escape while the reacting mass was agitated and maintained at a temperature between 60° and 70° for about three-quarters of an hour. The mass was then allowed to stand until it stratified. The upper layer was decanted and washed once with water. (The lower layer was discarded.) The washed oil was distilled until unreacted benzene had been removed (i. e., until the residual oil reached a boiling point of 100° at 20 mm. mercury pressure). The resulting oil comprised mainly a mixture of higher alkyl benzenes together with residual paraffin hydrocarbons and by-products of the reaction.

65 parts of the resulting oil were diluted with 12 parts of Stoddard solvent and cooled to 5°. Into the resulting solution 14 parts of chlorsulfonic acid were charged slowly so that the reaction mass could be maintained between 10° and 15°. The mixture was agitated for two hours after hydrogen chloride evolution had subsided, then it was allowed to stand for about 16 hours. The resulting sulfonated mass was made neutral to Brilliant Yellow paper by addition of the necessary amount of 50 per cent aqueous caustic soda. The neutral mixture was diluted with 9 parts of water, and vigorously agitated while further additions of 60 parts of Stoddard solvent, 14 parts of water and 1 part of dibutyl tartrate were made.

The resulting paste dispersed well in Stoddard solvent, but not as well as the product of Example 2.

*Example 4.*—Paraffin oil (known in the trade as "Ambrex D" and characterized by a pour test of 25, an A. P. I. gravity degree of 29=specific gravity 0.88 at 15°, and a molecular weight, by freezing point method, of about 370—corresponding to an average hydrocarbon molecule with about 26 carbon atoms) was chlorinated in diffused daylight with chlorine gas at a temperature between 80° and 95° until the weight of organically combined chlorine was 24 to 25 per cent of the weight of the chlorinated mixture.

A mixture of 225 parts of this chlorinated hydrocarbon mixture, 150 parts of phenetol and 15 parts of anhydrous aluminum chloride was agitated and maintained for about 2 hours at a temperature between 50° and 60°, then it was allowed to settle for about 16 hours. The upper layer was then washed twice with water, and distilled until all the unreacted phenetol was removed (i. e., until the boiling point of the residue reached about 135° at 20 mm. mercury pressure). The residue consisted of a brown oil which comprised mainly a mixture of higher alkyl phenetols, in which the alkyl groups were derived from the paraffin oil.

The latter brown oil was sulfonated in the presence of Stoddard solvent, neutralized with 50 per cent aqueous caustic soda and diluted with water, in the manner described in Example 2. The resulting product was a heavy oil adapted for use as a dry cleaning paste. 5 parts by volume of this oil mixed with 95 parts by volume of Stoddard solvent formed a mixture which was substantially optically clear by transmitted light. The cleaning paste, when diluted with water until it contained 45 per cent of water by weight, did not stratify, and 2 per cent solutions by volume of the diluted paste (containing about 45 per cent by volume of water) in Stoddard solvent were almost optically clear and formed excellent dry cleaning compositions which did not water-spot goods cleaned therewith.

*Example 5.*—150 parts of the chlorinated white oil prepared in the manner described in Example 2, 70 parts of phenol and 10 parts of anhydrous zinc chloride were agitated and heated to a temperature of 135° and maintained there for about 5 hours. After standing for about 15 hours, the upper layer of oil was decanted from the tarry heel and distilled in vacuo until the boiling point of the residue reached a temperature of 135° at 5 mm. mercury. The residue was a brown oil and consisted of a mixture of unreacted white oil and alkylated phenols.

To a mixture of 50 parts of the residual brown oil and 6 parts of Stoddard solvent, 12 parts of chlorsulfonic acid were added, while the temperature of the reacting mass was maintained between 8° and 12°. The mass was agitated for two hours, then made neutral to Brilliant Yellow paper with a 50 per cent aqueous caustic soda solution. The resulting paste was miscible with Stoddard solvent in all proportions, and the mixtures so formed which contained 5 per cent or less by volume of the paste were turbid by reflected light and almost optically clear by transmitted light. The dilute mixtures became more turbid as their content of paste was increased.

The paste, diluted with water until it contained 45 per cent by weight of water, did not stratify; and solutions in Stoddard solvent of the water-diluted paste, containing 2 per cent or less by volume of the diluted paste, were only slightly turbid.

*Example 6.*—Chlorine was passed into 300 parts of a petroleum white oil which boiled from 210° to 285° at 25 mm. pressure and had a probable average composition corresponding with the empirical formula $C_{23}H_{48}$, while maintaining the temperature at 50°. To facilitate the reaction, the reaction mixture, which was contained in a glass reaction vessel, was subjected to actinic light during the treatment with chlorine and was well agitated. The introduction of chlorine was discontinued when the reaction mixture had increased in weight about 33 parts, about 1.5 hours being required, and the agitation was continued thereafter for about fifteen minutes. (The increase in weight of about 33 parts corresponds substantially with the theoretical increase in weight for the formation of the mono-chloride.) 200 parts of the resulting chlorinated white oil, 200 parts of phenol and 35 parts of anhydrous zinc chloride were heated at 170° while being agitated in a vessel provided with a reflux condenser. After about 5 hours the heating was discontinued and the mixture allowed to cool. The oily product was decanted from the zinc chloride and fractionally distilled in vacuo. The distillate boiling from 240° to 300° at 3 mm. pressure was separately collected, and was sulfonated and converted to the sodium salt in the manner described in Example 1.

*Example 7.*—Chlorine was passed into 375 parts of a purified colorless petroleum distillate (white oil) which had a specific gravity of 0.843 at 25°, of which 90 per cent distilled from 215° to 285° at 25 mm. and which on the basis of its properties was regarded as comprising a hydrocarbon mixture in which the molecular carbon content of the hydrocarbons ranged from 20 to 28 carbon atoms and averaged 23 to 24 carbon atoms. The white oil contained 0.1 part of iodine as a chlorination catalyst and was maintained at a temperature between 55° and 60°. The chlorination was discontinued when the chlorinated mass contained 50 parts of organically combined chlorine. A mixture of 150 parts of benzene and 21 parts of anhydrous aluminum chloride was agitated while 300 parts of this chlorinated white oil were added, the mixture being maintained at a temperature of 25° to 30° for one hour and then at 50° to 55° for about one hour. The resulting mixture was allowed to separate into two layers. The upper layer was decanted and washed with 200 parts of a 10 per cent aqueous solution of sodium bisulfite. It was then washed twice, with 200 parts of water each time. The decanted oil mixture was distilled under a pressure of 25 mm. of mercury until the unreacted benzene was removed (i. e., until the boiling point of the residue reached 125° at 20 mm. mercury pressure). The residue consisted of a light amber-colored oil which comprised chiefly a mixture of higher alkyl benzenes in which the alkyl groups had an average carbon content of 23 to 24 carbon atoms and some original white oil.

50 parts of the residual oil were sulfonated with 8 parts of chlorsulfonic acid, the reaction mixture being maintained at a temperature between 12° and 15° during addition of the acid. The sulfonating mixture was agitated for 16 hours without cooling. The resulting mass was diluted with 18 parts of water and neutralized to Delta paper with 50 per cent aqueous caustic soda solution. The mixture was diluted with 58 parts of Stoddard solvent to form an oily paste containing approximately 20 per cent sodium alkyl benzene sulfonates.

The oily paste containing 20 per cent sodium aryl sulfonates can be diluted further with water, and will not stratify until the diluted mixture contains more than 70 parts of water or less than 8 parts of sodium aryl sulfonates. The water-diluted paste disperses readily in Stoddard solvent, giving a slightly turbid but relatively stable emulsion.

It will be realized by those skilled in the art that changes may be made in the compositions, and in the processes of preparing and using them, herein described, without departing from the scope of the invention.

The higher alkyl aryl sulfonates for the dry cleaning compositions of this invention may be made in a variety of ways, the general procedure comprising the alkylation of an aromatic compound to form an alkyl-aryl compound which is then converted to a sulfonate.

The alkylation of the selected aromatic compound may be effected by the several known methods as, for example, by means of an alkyl sulfate or phosphate, or by means of suitable higher alcohols or olefines in the presence of condensing agents such as sulfuric or phosphoric acid, zinc chloride, aluminum chloride, etc. The alkylations also may be effected by reacting the aromatic compound in the presence of a condensing agent such as aluminum chloride or zinc chloride with one or a number of alkyl halides or olefines in which the alkyl groups or olefines contain the desired number of carbon atoms.

The alkyl aromatic sulfonates may be prepared from the alkyl aromatic compounds in various ways. According to one method of preparation, an alkyl aromatic compound of the type AXR, in which the symbols A, X and R have the meaning defined above, and especially the aromatic components represented by AR in which A and R have the meaning defined above, may be treated with a sulfonating agent, in the presence or absence of a solvent or diluent and/or a sulfonation assistant. As sulfonating agents there may be employed sulfuric acids of various strengths (e. g., 66° Bé. sulfuric acid, sulfuric acid monohydrate, oleum) chlorsulfonic acid, etc. As solvents or diluent there may be employed any inert organic liquid which is not readily sulfonated, such as halogenated hydrocarbons of the aliphatic and aromatic series, as for example, Stoddard solvent, carbon tetrachloride, dichlorethane, tetrachlorethane, dichlorbenzene, etc. As sulfonation assistants there may be employed the lower organic acids and/or their anhydrides, as for example, acetic acid, acetic anhydride, etc.

The sulfonation may be carried out with the aid of heating or cooling, as required, depending upon the ease of sulfonation of the alkyl aromatic compound and the sulfonating power of the sulfonating agent. The sulfonation may be carried out to an extent such that mainly one, or more or less than one, sulfonic acid group is present in the final product (based on the alkyl aromatic compound). In general the extent of sulfonation is preferably less than that necessary for complete monosulfonation since undersulfonated products show better water dispersing action.

The alkyl aromatic sulfonates are preferably employed in accordance with the present invention in the form of their salts of metals (as for example, of the alkali metals) or of organic bases, or of ammonia, etc. The salts may be obtained in any suitable manner; for example by reacting the sulfonated product, either in the crude form resulting from the sulfonation or in a purified form, with a metal oxide or hydroxide, ammonia or an organic base, or of a suitable salt of one of these, preferably in an amount adapted to form a neutral product. Among the bases, oxides and salts which may be combined with the sulfonated products to produce salts useful in accordance with the present invention are, for example, sodium, potassium and ammonium carbonates and bicarbonates; ammonia; magnesium oxide; ethylamine; pyridine; triethanolamine; propanolamines; butanolamines; diamino propanol ethylenediamine; triethylene tetramine; etc.

It is to be understood that the invention includes compositions containing products containing a plurality of alkyl aromatic sulfonic acid nuclei linked together through the sulfonic acid groups by a polyvalent metal or organic basic radical, as well as products in which an alkyl aromatic sulfonic acid is linked through the sulfonic acid group to a different acid compound by a polyvalent metal or organic basic radical.

Thus the invention comprehends compounds of the type $(Z)_n$—M—$(Z')_n$ and $(Z)_n$—M—$(Y)_n$, wherein Z and Z' each represent the radical

which may be the same or different, M represents a polyvalent metal or organic base, Y represents a radical containing an acid group. $n$ represents a whole number, and A, X and R have the meaning defined above. Examples of such types of compounds are

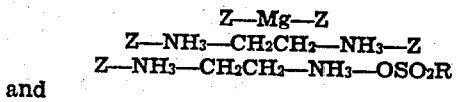
and
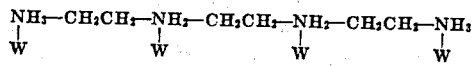

wherein Z and R have the meaning defined above, and W represents a radical containing an acid group at least one of which is a radical of the type represented by Z.

In the foregoing examples, neutralized sulfonation products are mixed with Stoddard solvent and water to form pastes which are added to the dry cleaning baths. The preparation of the cleaning compounds in the form of such pastes is a mere convenience; for example, it saves cost of drying the neutralized sulfonate. The pastes can be made from the dry sulfonates, or their aqueous solutions, or their suspensions in water or in cleaning solvents, as desired. The use of pastes is preferable to the use of the dry sulfonates. However, the invention is not limited to the pastes and dry products may be used.

The new cleaning compounds are useful with Stoddard solvent, and especially with chlorinated solvents, such as trichlorethylene, carbon tetrachloride, etc. The dry cleaning pastes may be made up with such chlorinated hydrocarbons as the solvent constituents in place of the Stoddard solvent which is used in the foregoing illustrative examples.

It is to be noted that mixtures of two or more of the sulfonated products hereinbefore referred to may be employed.

For the purpose of illustration, the following additional products, in the form of the free sulfonic acids and in the salt (e. g., sodium salt) form, are mentioned as suitable for use in accordance with the present invention; but the invention is not limited thereto, as will be evident from the disclosure herein:

Tricosyl phenetol sulfonate (obtainable by condensing tricosanol-7 with phenetol, followed by sulfonation).

N-cerotyl-orthoaminotoluene sulfonate (obtained by condensing cerotic acid, derived from carnauba wax, with o-toluidine, followed by sulfonation).

Cerotyl benzene sulfonate (obtained by condensing cerotyl chloride, i. e., the acid chloride of cerotic acid, with benzene, followed by sulfonation).

Myricyl benzene sulfonate (obtained by condensing myricyl chloride, i. e., the chloride derived from myricyl alcohol, with benzene, followed by sulfonation).

The following additional examples illustrate the use in dry cleaning of the alkyl aryl sulfonates disclosed herein. They are directed to the use of an oily paste containing about 20 per cent sodium alkyl benzene sulfonates, about 14 per cent of water, about 5½ per cent of white oil and about 60 per cent of Stoddard solvent, and prepared in the manner described in Example 7. For convenience the paste is hereinafter identified as "dry cleaning paste." It will be understood, however, that these examples are merely illustrative and that any of the other alkyl aryl sulfonates hereinbefore described may be similarly employed; and further that the proportions of ingredients, solvent employed, and method of treatment, may be varied.

*Example 8.—Cleaning white woolens and silks, or dark silks*

A washer of the type generally used in dry cleaning is charged with Stoddard solvent at room temperature (i. e., about 70° F.) and the fabrics to be washed, comprising chiefly white woolens or silks or dark-colored silks, are immersed in the solvent. The washer is connected with circulating means and a filter, whereby the solvent can be passed through the filter and returned to the washer. The Stoddard solvent is passed through the filter and back to the washer for about 15 minutes while the fabrics are agitated in the circulating solvent. From 3 to 5 pounds of the dry cleaning paste are added for each 100 gallons of Stoddard solvent in the washer (i. e., from 0.09 to 0.15 pound of alkyl benzene sulfonate salts to each 100 pounds of cleaning solvent). Agitation of the fabrics in the resulting solution is continued for about one-half hour; then the solution is circulated through the filter and returned to the washer, until the filtered liquid in the washer is clear. The load of fabrics is then subjected to the usual extraction and drying operations.

*Example 9.—Cleaning heavy woolens*

The washing process for heavy woolen fabrics is effected in the manner described in Example 8, but the amount of the dry cleaning paste which is added to the cleaning solvent can be reduced to from about 2 to about 4 pounds of dry cleaning paste per 100 gallons of Stoddard solvent (about 0.06 to about 0.12 pound of alkyl benzene sulfonate salts for each 100 pounds of the solvent) in the washer.

*Example 10.—Pre-spotting of soiled fabrics*

A pre-spotting solution is prepared by adding from about one-half to one pound of the dry cleaning paste to about one gallon of cleaning solvent. If Stoddard solvent is used, the resulting solution contains from about 1.5 to about 3 parts by weight of alkyl benzene sulfonate salts, from about 1.05 to about 2.1 parts of water and from about 0.41 to about 0.83 part of white oil dissolved in 100 parts by weight of solvent. This solution is brushed over the soiled portion of the fabric.

*Example 11.—Glove- and leather-cleaning*

About one pound of the dry cleaning paste is dissolved in 5 gallons of Stoddard solvent. The resulting solution contains about 0.6 part by weight of alkyl benzene sulfonate salts, about 0.42 part by weight of water and about 0.16 part by weight of white oil dissolved in each 100 parts by weight of solvent. Gloves and leather articles are cleaned readily by being washed in and/or brushed with this solution.

*Example 12.—Felt hat-cleaning*

About one pound of the dry cleaning paste is dissolved in 10 gallons of Stoddard solvent, making a solution which contains about 0.3 part by weight alkyl benzene sulfonate salts, about 0.21 part by weight of water and about 0.083 part by weight of white oil dissolved in each 100 pounds of solvent. The solution is particularly suitable for cleaning felt hats.

While the dry cleaning agents of this invention are generally used alone they may, if desired, be mixed with other dry cleaning agents in quantities such that their beneficial action is apparent.

This application is a continuation-in-part of my applications Serial Nos. 691,082, filed September 26, 1933 (issued as U. S. P. 2,249,757 on July 22, 1941); 737,777, filed July 31, 1934 (issued as U. S. P. 2,196,985 on April 16, 1940); and 42,164, filed September 25, 1935 (issued as U. S. P. 2,271,635 on February 3, 1942).

I claim:

1. A dry cleaning composition adapted for use in the dry cleaning of textile and fibrous materials, comprising a volatile organic liquid of the dry cleaning type and as a dry cleaning assistant a minor proportion of an oil-soluble salt of an alkyl aromatic sulfonate in which the alkyl group contains 20 to 30 carbon atoms and corresponding in the free acid form with the formula

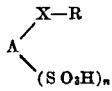

wherein A is an aromatic residue, R is an alkyl group containing 20 to 30 carbon atoms and which may be substituted by a member of the group consisting of hydroxy, alkoxy, aryl and halogen, X is a linkage joining a carbon atom of the alkyl group R to a carbon atom of the aromatic nucleus A and selected from the group consisting of direct linkage, linkage through an oxygen atom, and linkage through one of the radicals —NH—, —NHCO—, —CO—, and —COO—, and $n$ is a small whole number.

2. A dry cleaning composition adapted for use in the dry cleaning of textile and fibrous materials, comprising a volatile organic liquid of the dry cleaning type and a small amount of an oil-soluble salt of an alkyl mononuclear aromatic sulfonate in which the alkyl group is a hydrocarbon radical containing 20 to 30 carbon atoms and is a nuclear substituent, as a dry cleaning assistant.

3. A dry cleaning composition adapted for use in the dry cleaning of textile and fibrous materials, comprising a volatile organic liquid of the dry cleaning type and a dry cleaning assistant comprising a mixture of oil-soluble salts of alkyl aromatic sulfonates in which the alkyl groups contain from 20 to 30 carbon atoms and are derived from chlorinated hydrocarbons.

4. A dry cleaning composition adapted for use in the dry cleaning of textile and fibrous materials, comprising a volatile organic liquid of the dry cleaning type and a dry cleaning assistant comprising a mixture of oil-soluble salts of alkyl mononuclear aromatic sulfonates in which the alkyl groups are hydrocarbon radicals containing from 20 to 30 carbon atoms which are derived from a petroleum hydrocarbon mixture and are nuclear substituents.

5. A dry cleaning composition adapted for use in the dry cleaning of textile and fibrous materials, comprising an emulsion of water in a volatile organic liquid of the dry cleaning type, the water being the internal phase, and an oil-soluble salt of an alkyl aromatic sulfonate corresponding in the free acid form with the formula

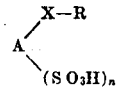

as an emulsifying agent for the water and as a dry cleaning assistant, wherein A is an aromatic residue, R is an alkyl group containing 20 to 30 carbon atoms and which may be substituted by a member of the group consisting of hydroxy, alkoxy, aryl and halogen, X is a linkage joining a carbon atom of the alkyl group R to a carbon atom of the aromatic nucleus A and selected from the group consisting of direct linkage, linkage through an oxygen atom, and linkage through one of the radicals —NH—, —NHCO—, —CO—, and —COO—, and $n$ is a small whole number.

6. A dry cleaning composition adapted for use in the dry cleaning of textile and fibrous materials, comprising a solution in an organic liquid of the dry cleaning type of a mixture of alkali metal salts of monoalkyl aromatic sulfonates in which the alkyl group contains 20 to 30 carbon atoms and corresponding in the free acid form with the formula

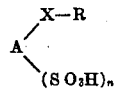

wherein A is an aromatic residue, R is an alkyl group containing 20 to 30 carbon atoms, and which may be substituted by a member of the group consisting of hydroxy, alkoxy, aryl and halogen, X is a linkage joining a carbon atom of the alkyl group R to a carbon atom of the aromatic nucleus A and selected from the group consisting of direct linkage, linkage through an oxygen atom, and linkage through one of the radicals —NH—, —NHCO—, —CO—, and —COO—, and $n$ is a small whole number.

7. A dry cleaning composition adapted for use in the dry cleaning of textile and fibrous materials, comprising a solution in an organic liquid of the dry cleaning type of a small amount of an oil soluble salt of an alkyl aromatic sulfonate in which the alkyl group is a hydrocarbon radical containing 20 to 30 carbon atoms, as a dry cleaning assistant.

8. A dry cleaning composition adapted for use in the dry cleaning of textile and fibrous materials, comprising an emulsion of water in a volatile organic liquid of the dry cleaning type, the water being in the internal phase, and an oil-soluble salt of an alkyl aromatic sulfonate in which the alkyl group is a hydrocarbon radical containing 20 to 30 carbon atoms, as an emulsifying agent for the water and as a dry cleaning assistant.

9. A dry cleaning composition adapted for use in the dry cleaning of textile and fibrous materials, comprising an emulsion of water in a volatile organic liquid of the dry cleaning type, the water being in the internal phase, and a mixture of oil-soluble salts of alkyl mononuclear aromatic sulfonates in which the alkyl groups are hydrocarbon radicals containing from 20 to 30 carbon atoms which are derived from a petroleum hydrocarbon mixture and are nuclear substituents, as an emulsifying agent for the water and as a dry cleaning assistant.

10. A dry cleaning composition adapted for use in the dry cleaning of textile and fibrous materials, comprising a solution in a volatile organic liquid of the dry cleaning type of a mixture of oil-soluble salts of alkyl mononuclear aromatic sulfonates in which the alkyl groups are hydrocarbon radicals containing from 20 to 30 carbon atoms which are derived from a petroleum hydrocarbon mixture and are nuclear substituents, as a dry cleaning assistant, and a small amount of a petroleum hydrocarbon lubricant selected from the class consisting of paraffin oil and paraffin wax.

11. A dry cleaning composition comprising about 100 parts by weight of a volatile organic liquid of the dry cleaning type, 0.05 to 3 parts of a mixture of oil-soluble salts of alkyl mononuclear aromatic sulfonates in which the alkyl groups are hydrocarbon radicals containing from 20 to 30 carbon atoms which are derived from a petroleum hydrocarbon mixture and are nuclear substituents, and .035 to 2.1 parts of water.

12. A dry cleaning composition comprising about 100 parts by weight of a volatile organic liquid of the dry cleaning type, 0.05 to 3 parts of a mixture of oil-soluble salts of alkyl mononuclear aromatic sulfonates in which the alkyl groups are hydrocarbon radicals containing from 23 to 26 carbon atoms which are derived from a petroleum hydrocarbon mixture and are nuclear substituents, 0.014 to 0.83 part of a petroleum hydrocarbon containing 20 to 30 carbon atoms selected from the group consisting of paraffin oil and paraffin wax, and 0.035 to 2.1 parts of water.

13. A dry cleaning composition comprising about 100 parts by weight of a volatile organic liquid of the dry cleaning type, and 0.05 to 5.0 parts of a mixture of alkyl mononuclear aromatic sodium sulfonates in which the alkyl groups are hydrocarbon radicals containing from 20 to 30 carbon atoms which are derived from a petroleum hydrocarbon mixture and are nuclear substituents.

14. A dry cleaning composition comprising about 100 parts by weight of a volatile organic liquid of the dry cleaning type, and 0.05 to 3.0 parts of a mixture of alkyl benzene sodium sulfonates in which the alkyl groups are hydrocarbon radicals containing from 23 to 26 carbon atoms which are derived from a petroleum hydrocarbon mixture and are nuclear substituents.

15. A dry cleaning composition adapted for use in the dry cleaning of textile and fibrous materials, comprising a volatile organic liquid of the dry cleaning type and a small amount of a mixture of alkyl benzene sodium sulfonates in which the alkyl groups contain 20 to 30 carbon atoms and are residues of hydrocarbons present in a liquid fraction of petroleum boiling mostly within the range from 195° to 295° C. at 15 mm. pressure.

16. A dry cleaning composition comprising a volatile mineral oil dry cleaning liquid and in admixture therewith a small amount of an oil soluble metal salt of an alkyl aromatic sulfonate characterized by the presence of an alkyl-substituted aryl nucleus in which the alkyl substituent is a hydrocarbon radical containing 20 to 30 carbon atoms.

17. A mineral oil composition comprising: a mineral oil fraction and in admixture therewith a minor proportion of an oil-miscible metal salt of an alkyl aromatic sulfonate characterized by the presence of an alkyl-substituted aryl nucleus in which the alkyl substituent is a hydrocarbon radical containing 20 to 30 carbon atoms.

18. A mineral oil composition comprising a mineral oil fraction and in admixture therewith a minor proportion of oil-miscible metal salts of a mixture of alkyl benzene sulfonates in which the alkyl substituents are nuclear substituents and are hydrocarbon radicals containing 20 to 30 carbon atoms.

LAWRENCE H. FLETT.